United States Patent
Park et al.

(10) Patent No.: US 12,085,884 B2
(45) Date of Patent: Sep. 10, 2024

(54) TONER CARTRIDGE HAVING FRONT COVER

(71) Applicant: Hewlett-Packard Development Company, L.P., Spring, TX (US)

(72) Inventors: Jinsam Park, Seongnam-si (KR); Jinhong Kim, Seongnam-si (KR); Gun Heo, Seongnam-si (KR); Seongwoong Yang, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/014,740

(22) PCT Filed: Nov. 17, 2020

(86) PCT No.: PCT/US2020/060890
§ 371 (c)(1),
(2) Date: Jan. 5, 2023

(87) PCT Pub. No.: WO2022/010522
PCT Pub. Date: Jan. 13, 2022

(65) Prior Publication Data
US 2023/0273566 A1    Aug. 31, 2023

(30) Foreign Application Priority Data
Jul. 8, 2020    (KR) .................. 10-2020-0084040

(51) Int. Cl.
*G03G 21/16*    (2006.01)
*G03G 15/08*    (2006.01)

(52) U.S. Cl.
CPC ..... *G03G 21/1647* (2013.01); *G03G 15/0875* (2013.01); *G03G 21/1676* (2013.01); *G03G 2221/1654* (2013.01)

(58) Field of Classification Search
CPC ........... G03G 15/0886; G03G 15/0896; G03G 15/0867
See application file for complete search history.

(56) References Cited

U.S. PATENT DOCUMENTS

| | | | |
|---|---|---|---|
| 5,798,777 | A | 8/1998 | Yoshimura et al. |
| 5,860,363 | A | 1/1999 | Childers et al. |
| 2004/0114961 | A1 | 6/2004 | Yoshino et al. |
| 2008/0230730 | A1 | 9/2008 | Brown et al. |

(Continued)

FOREIGN PATENT DOCUMENTS

| | | |
|---|---|---|
| CN | 207337079 U | 5/2018 |
| JP | 2000-181224 A | 6/2000 |
| JP | 2001-083858 A | 3/2001 |

(Continued)

*Primary Examiner* — Jessica L Eley
(74) *Attorney, Agent, or Firm* — Foley & Lardner LLP

(57) ABSTRACT

A toner cartridge includes: a housing to accommodate toner and including a fastening boss at a front end; a front cover including a fastening hole aligned with the fastening boss; a fastening member including a fastening portion and a head portion, the fastening portion configured to pass through the fastening hole and be fastened to the fastening boss to couple the front cover to the housing; and a separating portion to allow the fastening hole to be separated from the head portion of the fastening member by an external force acting on the front cover.

15 Claims, 9 Drawing Sheets

(56) References Cited

U.S. PATENT DOCUMENTS

2013/0051833 A1* 2/2013 Itabashi ............. G03G 21/1676
399/119
2017/0190193 A1* 7/2017 Migita .................... B41J 29/02

FOREIGN PATENT DOCUMENTS

KR       10-1854854 B1    6/2018
WO      2020/013841 A1    1/2020

* cited by examiner

TONER CARTRIDGE HAVING FRONT COVER

CROSS-REFERENCE TO RELATED APPLICATIONS

This application is filed under 35 U.S.C. § 371 as a National Stage of PCT International Application No. PCT/US2020/060890, filed Nov. 17, 2020, which claims priority to KR Patent Application No. 10-2020-0084040, filed Jul. 8, 2020, which are incorporated by reference herein in their entireties.

BACKGROUND

In image forming apparatuses using an electrophotographic method, toner is supplied to an electrostatic latent image formed on a photoconductor to form a visible toner image on the photoconductor, and the toner image is transferred directly or via an intermediate transfer medium to a print medium, and then the transferred toner image is fixed to the print medium.

An image forming apparatus may include a toner cartridge that is attached to and detached from a main body. The toner cartridge is replaced at the end of its life. When the toner contained in the toner cartridge is consumed, the toner cartridge can be removed from the main body, and a new toner cartridge can be mounted on the main body.

DETAILED DESCRIPTION

Figure 1:
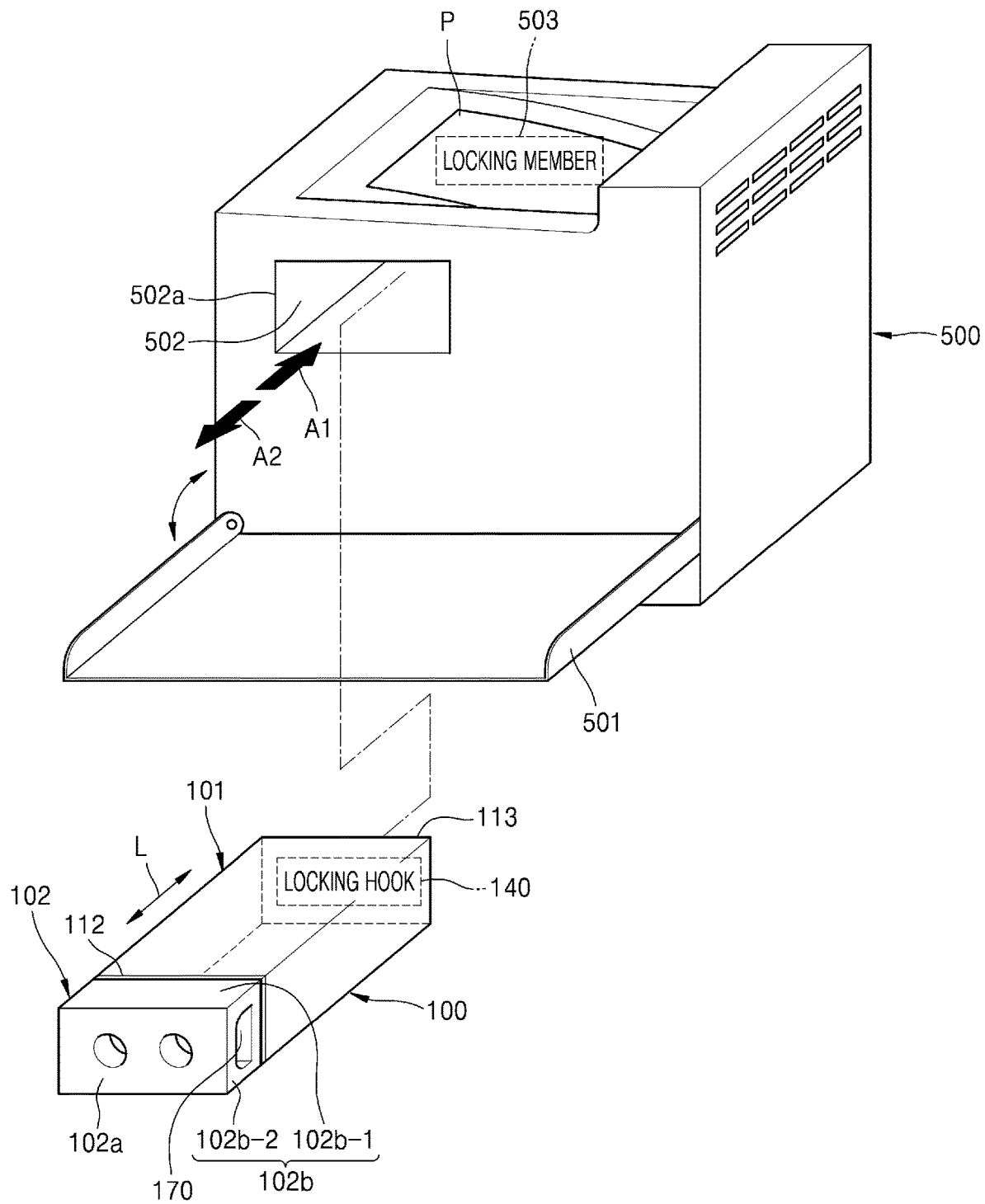
FIG. 1 is a schematic perspective view of an example of an image forming apparatus.

An image forming apparatus that prints an image on a print medium by using an electrophotographic method, includes a replaceable toner cartridge. A developer is accommodated in the toner cartridge. The toner cartridge is also referred to as a developer cartridge. The developer may include toner or toner and a carrier. In order to prevent arbitrary replacement of the toner cartridge, when the toner cartridge is mounted on a main body of the image forming apparatus, the toner cartridge is locked in the main body. When the user inputs a toner cartridge replacement command through an input device of the image forming apparatus or through a host connected to the image forming apparatus, the locking of the toner cartridge is released, and the toner cartridge becomes removable from the main body. However, when the toner cartridge is locked in the main body and the user arbitrarily pulls the toner cartridge in a removal direction to remove the toner cartridge, a locking device may be damaged.

The toner cartridge according to the present example includes a housing and a front cover coupled to one end of the housing by a fastening member. In an example of the toner cartridge, when an external force of a direction in which the toner cartridge is removed from the main body, acts on the front cover, the toner cartridge includes a separating portion that allows a fastening hole of the front cover to be separated from a head portion of the fastening member. The external force may be greater than force for removing the toner cartridge when the locking of the toner cartridge is released. The external force may be less than force for damaging the locking device. An example of the separating portion may be implemented in such a way that, when the external force of a direction in which the toner cartridge is removed from the main body, acts on the front cover, the diameter of part of the fastening hole may be greater than the diameter of the head portion of the fastening member so that the head portion of the fastening member may be separated from the fastening hole. An example of the separating portion may be implemented in such a way that, when the diameter of the fastening hole is greater than the head portion of the fastening member, an elastically deformable elastic member is interposed between the front cover and the head portion of the fastening member and the external force in a direction in which the toner cartridge is removed from the main body, acts on the front cover, the elastic member may be elastically deformed and the head portion of the fastening member may be separated from the fastening hole. Through this configuration, the toner cartridge may be kept locked in the main body, and damage of the locking device may be prevented. Also, arbitrary replacement of the toner cartridge may be prevented. Hereinafter, examples of a toner cartridge and an image forming apparatus including the same will be described with reference to the drawings. In the drawings, the same reference numerals refer to components having the same function, and the size of each component may be exaggerated for clarity and convenience of explanation.

FIG. 1 is a schematic perspective view of an example of an image forming apparatus. Referring to FIG. 1, the image forming apparatus may include a main body 500 and a toner cartridge 100 that is attached to (or attachable to) and detached from (or detachable from) the main body 500. The main body 500 may include a printing unit that prints an image on a print medium P by an electrophotographic method. Toner to be supplied to the main body 500 may be accommodated in the toner cartridge 100.

In an example, the printing unit may include an optical scanner, a developing device, a transfer device, and a fixing device. The developing device may include a photoconductive drum and a developing roller. The optical scanner may irradiate light corresponding to image information onto the surface of the photoconductive drum charged with a uniform surface electric potential and may form an electrostatic latent image. The developing roller may supply the toner accommodated in the developing device to the electrostatic latent image and may develop the electrostatic latent image into a visible toner image. The transfer device may transfer the toner image formed on the photoconductive drum onto the print medium P. The toner image transferred onto the print medium P may be attached to and held on the print medium P by an electrostatic force. When the print medium P passes through the fixing device, the toner image may be fixed on the print medium P by heat and pressure. The print medium P, after printing is completed, may be discharged to the outside of the main body 500.

The toner cartridge 100 may be connected to the developing device and may supply toner to the developing device. The toner cartridge 100 may be attached to and detached from the image forming apparatus. That is, the toner cartridge 100 may be attachable to and detachable from the image forming apparatus. A mounting portion 502 and a locking member 503 may be located on the main body 500. When the door 501 is opened to open part of the main body 500, an entrance 502a of the mounting portion 502 may be exposed. The toner cartridge 100 may be aligned with the entrance 502a of the mounting portion 502 and may slide in a mounting direction A1 and thus may be mounted on the main body 500. The toner cartridge 100 mounted on the main body 500 may slide in a removal direction A2 and thus may be removed from the main body 500. The mounting direction A1 and the removal direction A2 may be a longitudinal direction L of the toner cartridge 100. The locking member 503 may lock the toner cartridge 100, so that, when the toner cartridge 100 is mounted on the main body 500, the locking member 503 may be hung on a locking hook 140 of the toner cartridge 100 and the toner cartridge 100 may not be removed from the main body 500.

Figure 2:
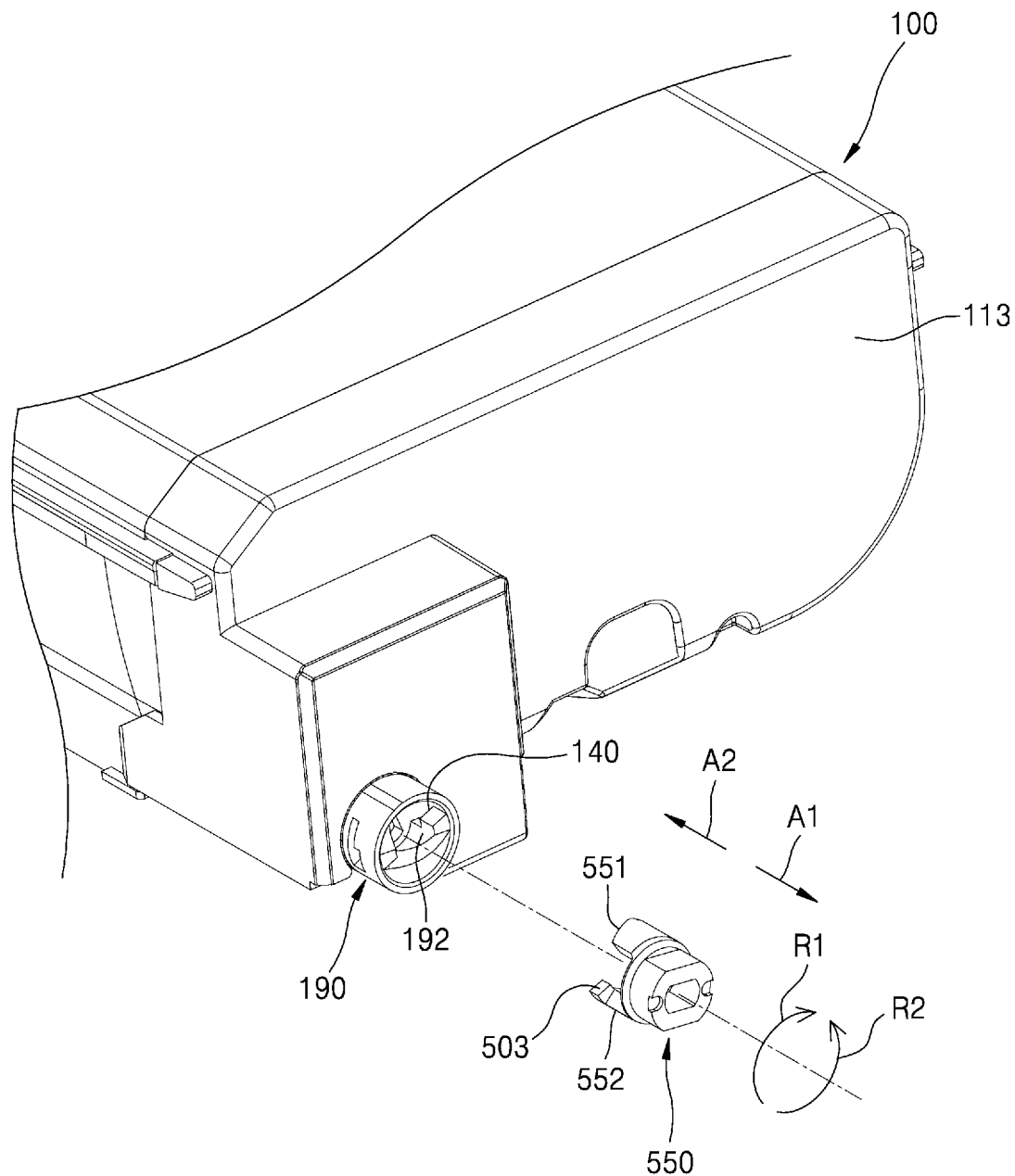
FIG. 2 is a partially-exploded perspective view of an example of a locking structure.

FIG. 2 is a partially-exploded perspective view of an example of a locking structure. Referring to FIG. 2, the locking structure may include a locking member 503 located on the main body 500 and the locking hook 140 located on the toner cartridge 100. When the toner cartridge 100 is mounted on the main body 500, the toner cartridge 100 may be connected to a motor (not shown) located on the main body 500 by a coupling structure and may receive a rotational force from the motor so that a rotation member inside the toner cartridge 100 may rotate. The rotation member may include, for example, one or more transfer members that transfer toner inside the toner cartridge 100 to a toner discharge port. The coupling structure may include a driving coupler 550 located on the main body 500 and a driven coupler 190 located on the toner cartridge 100. The driving coupler 550 may include a rotational force transmission portion 552. The driven coupler 190 may include a rotational force receiving portion 192 that receives the rotational force from the rotational force transmission portion 552. When the toner cartridge 100 is mounted on the mounting portion 502 of the main body 500, the rotational force transmission portion 552 and the rotational force receiving portion 192 may face each other in a rotation direction. When the driving coupler 550 is rotated in a first rotation direction R1, the rotational force transmission portion 552 may push the rotational force receiving portion 192 in the first rotation direction R1. Thus, the driven coupler 190 is rotated in the first rotation direction R1.

In an example, the locking member 503 and the locking hook 140 may be located on the driving coupler 550 and the driven coupler 190, respectively. The locking member 503 may extend from the rotational force transmission portion 552 in a circumferential direction. The locking hook 140 may extend from the rotational force receiving portion 192 in the circumferential direction. The toner cartridge 100 may be mounted on the mounting portion 502 of the main body 500 while the locking member 503 and the locking hook 140 are displaced from each other in the rotation direction. When the toner cartridge 100 reaches a mounting position, the rotational force transmission portion 552 and the rotational force receiving portion 192 may face each other in the rotation direction. When the driving coupler 550 is slightly rotated in the first rotation direction R1, the locking hook 140 may be hung on the locking member 503. That is, the locking member 503 and the locking hook 140 may face each other in the removal direction A2. Thus, the toner cartridge 100 may not move in the removal direction A2 and may be locked in the mounting position. When the driving coupler 550 is continuously rotated in the first rotation direction R1, the rotational force transmission portion 552 may push the rotational force receiving portion 192 in the first rotation direction R1, and the driven coupler 190 may be rotated in the first rotation direction R1.

In order to remove the toner cartridge 100 from the mounting portion 502, the locking of the toner cartridge 100 may be released. For example, when the remaining amount of toner inside the toner cartridge 100 reaches a replacement reference remaining amount, the image forming apparatus may output a replacement signal that is capable of being recognized by the user to replace the toner cartridge 100, via an output device (not shown), for example, a display, a buzzer, a lighting device, etc. The replacement signal may be, for example, an image signal displayed on the display, a sound signal through the buzzer, and an optical signal through the lighting device. The user may input an operation of requesting replacement of the toner cartridge 100 through an operation panel. A control unit (not shown) may guide the user's operation procedure for replacement of the toner cartridge 100 through the display, for example, and the user may replace the toner cartridge 100 according to the guide. In order to prevent arbitrary replacement of the toner cartridge 100, the operation procedure may include inputting a password. The control unit may slightly rotate the driving coupler 550 in the second rotation direction R2 that is an opposite direction of the first rotation direction R1, according to the user's operation. Then, the locking member 503 may be released from the locking hook 140, and the toner cartridge 100 becomes movable in the removal direction A2. The main body 500 may also be provided with a pop-up structure for slightly pushing the toner cartridge 100 in the removal direction A2 after the locking of the toner cartridge 100 is released. For example, the pop-up structure may have various structures including an actuator or cam structure driven in the removal direction A2.

When the toner cartridge 100 is pulled in the removal direction A2 when the locking of the toner cartridge 100 is not released, the locking member 503 and the locking hook 140 may be damaged, and the driving coupler 550, a driving unit provided in the main body 500 to drive the driving coupler 550, and the driven coupler 190 may also be damaged. When the damaged locking member 503, locking hook 140, driving coupler 550 and the driven coupler 190 remain in the main body 500, time and costs are required to repair the image forming apparatus. The image forming apparatus and the toner cartridge 100 according to the present example may have a structure for preventing removal of the toner cartridge 100 when the locking of the toner cartridge 100 is not released.

Figure 3:
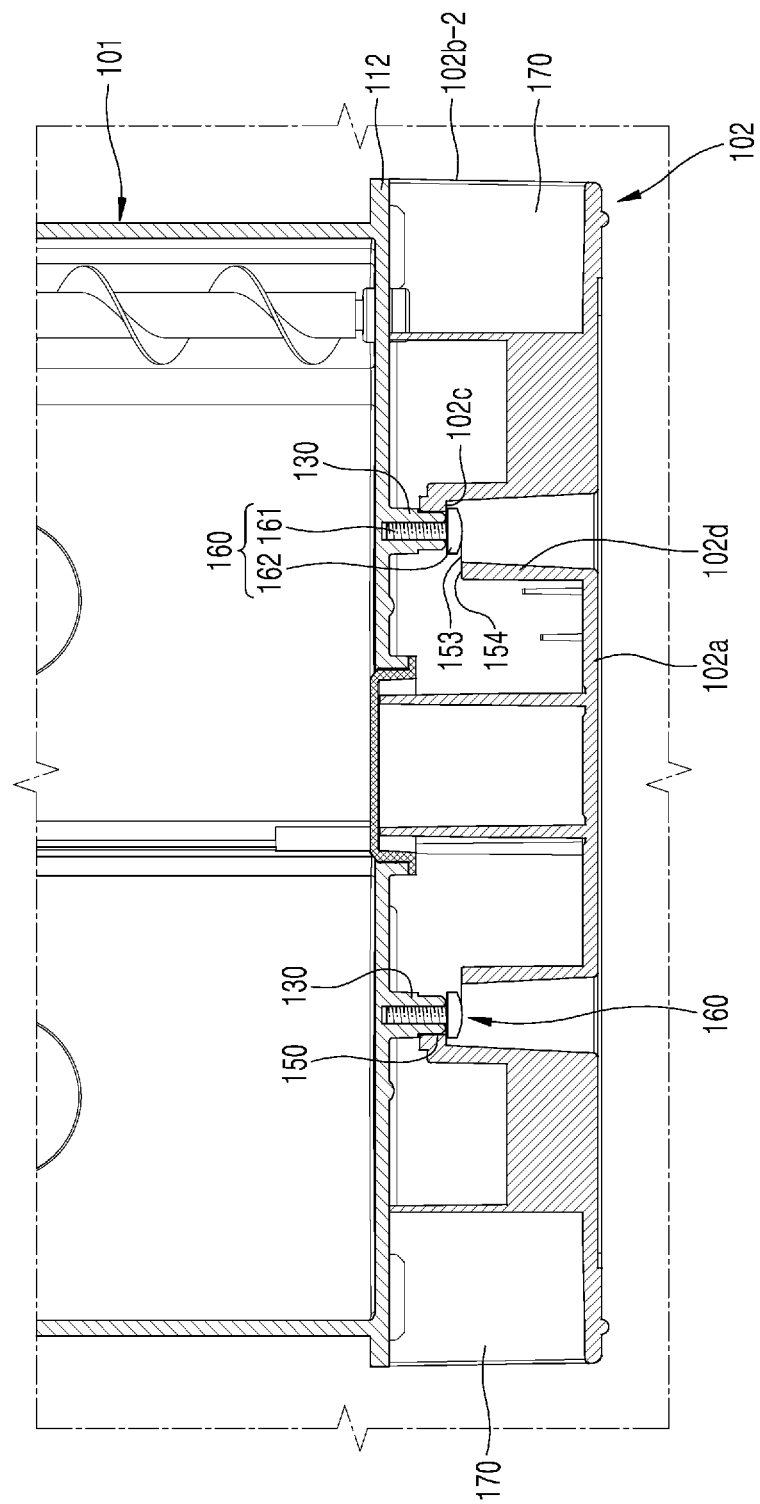
FIG. 3 is a schematic cross-sectional view of an example of a removal prevention structure.
Figure 4:
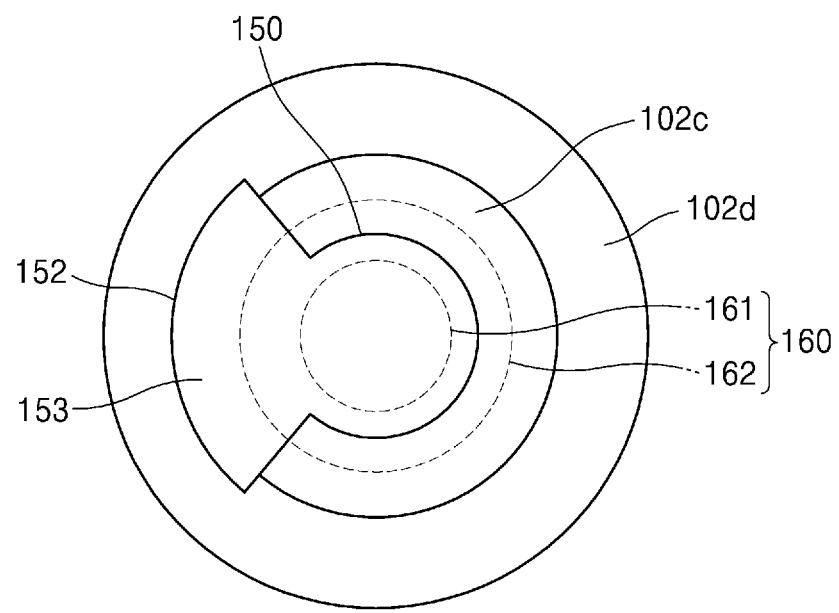
FIG. 4 is a front view of an example of a fastening hole shown in FIG. 3.

FIG. 3 is a schematic cross-sectional view of an example of a removal prevention structure. FIG. 4 is a front view of an example of the fastening hole 150 shown in FIG. 3. Referring to FIGS. 1, 3, and 4, an example of the image forming apparatus may include the main body 500 including the mounting portion 502 and the locking member 503, and the toner cartridge 100 that is attached to and detached from the mounting portion 502. An example of the toner cartridge 100 may include a housing 101 in which toner is accommodated and which has a fastening boss 130 formed at a front end 112 in the longitudinal direction L, a front cover 102 having a fastening hole 150 aligned with the fastening boss 130, a fastening member 160 including a fastening portion 161 and a head portion 162, the fastening portion 161 passing through the fastening hole 150 and being fastened to the fastening boss 130 to couple the front cover 102 to the housing 101, and a separating portion that allows the fastening hole 150 to be separated from the head portion 162 of the fastening member 160 by an external force pulling (or acting on) the front cover 102. An example of the toner cartridge 100 may include the locking hook 140 that is provided at a rear end 113 in the longitudinal direction L of the housing 101 and hung on the locking member 503.

The housing 101 may have a cylindrical shape that extends in the longitudinal direction L and is capable of accommodating toner therein. The housing 101 may include the front end 112 and the rear end 113 that is opposite to the front end 112 in the longitudinal direction L with respect to the front end 112. The front cover 102 may be coupled to the front end 112. The front cover 102 may include a front wall 102a and a sidewall 102b extending from the front wall 102a toward the front end 112 of the housing 101. The sidewall 102b may extend from the front wall 102a toward the front end 112 of the housing 101. A handle 170 may be provided on the sidewall 102b. The handle 170 may be sunken from the sidewall 102b inwards. The sidewall 102b may include a first sidewall 102b-1 positioned at upper and lower sides, and a second sidewall 102b-2 positioned on a lateral side. In an example, the handle 170 may be sunken from the second sidewall 102b-2 inwards.

The front cover 102 may be coupled to the front end 112 of the housing 101 by the fastening member 160. In an example, a fastening boss 130 may be provided at the front end 112 of the housing 101. A fastening hole 150 may be provided in the front cover 102. The fastening boss 130 may protrude from the front end 112 of the housing 101. The front cover 102 may be provided with a stepped portion 102c stepped from the front wall 102a facing the front end 112 of the housing 101 toward the front end 112 of the housing 101, and the fastening hole 150 may be formed in the stepped portion 102c. The stepped portion 102c may be connected to the front wall 102a by a connection wall 102d. The fastening member 160 may include the fastening portion 161 and the head portion 162. The fastening portion 161 may be, for example, a screw portion. The fastening portion 161 may pass through the fastening hole 150 and may be fastened to the fastening boss 130. The head portion 162 may press the stepped portion 102c toward the fastening boss 130 so that the front cover 102 may be coupled to the housing 101.

The diameter of the fastening hole 150 may be less than the diameter of the head portion 162 of the fastening member 160. In this case, an example of the separating portion may be implemented with a separation hole 152 extending from the fastening hole 150 and having a diameter greater than that of the head portion 162 of the fastening member 160. The fastening hole 150 may have a partially arc shape through which the fastening portion 161 of the fastening member 160 passes, and may be connected to the separation hole 152. The fastening portion 161 of the fastening member 160 may pass through the fastening hole 150 and may be fastened to the fastening boss 130. The head portion 162 may press the stepped portion 102c. Since the fastening hole 150 has a partially arc shape, the portion of the head portion 162 of the fastening member 160 that corresponds to the fastening hole 150 may press the stepped portion 102c. The separation hole 152 may extend up to the connection wall 102d. Thus, an opening 153 may be formed in the connection wall 102d. A distance from the stepped portion 102c to an end 154 of the opening 153 toward the front wall 102a may be greater than a thickness of the head portion 162 of the fastening member 160. The separation hole 152 may be positioned at an opposite site of the adjacent handle 170 based on the fastening hole 150. In the present example, the handle 170 may be provided on the second sidewall 102b-2 on a lateral side. Thus, the separation hole 152 may be positioned at an opposite side of the second sidewall 102b-2 based on the fastening hole 150. In the present example, two handles 170 may be provided, and two separating portions corresponding to the two handles 170 may be provided. The diameter and shape of the separation hole 152 may be determined in such a way that the head portion 162 of the fastening member 160 may not be separated through the separation hole 152 by bending of the front cover 102 due to an external force acting on the front cover 102 to remove the toner cartridge 100 in an unlocked state. The diameter and shape of the separation hole 152 may be determined in such a way that the head portion 162 of the fastening member 160 may pass through the separation hole 152 before the size of an external force acting on the front cover 102 to remove the toner cartridge 100 in a locked state reaches a size at which the locking member 503 or the locking hook 140 is damaged.

Figure 5:
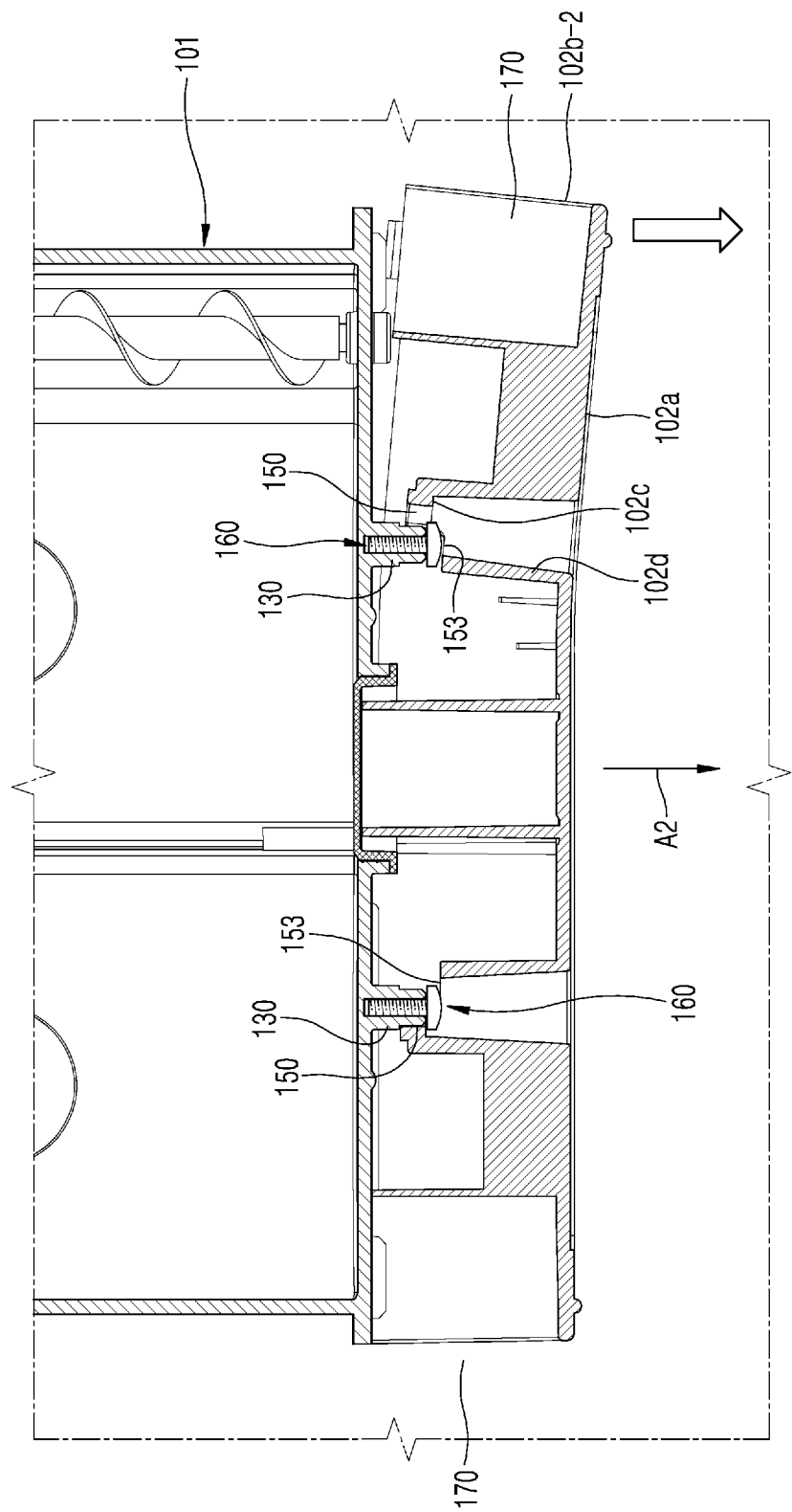
FIG. 5 is a view showing an operation of an example of the removal prevention structure shown in FIGS. 3 and 4.

FIG. 5 is a view showing an operation of an example of the removal prevention structure shown in FIGS. 3 and 4. When the toner cartridge 100 is mounted on the mounting portion 502, the locking member 503 of the main body 500 may be hung on the locking hook 140 of the toner cartridge 100 and thus the toner cartridge 100 may be locked in the main body 500. In this state, even when the handle 170 is pulled in the removal direction A2 to arbitrarily remove the toner cartridge 100, the toner cartridge 100 may not be moved in the removal direction A2. Instead, as shown in FIG. 5, while the front cover 102 is bent in the removal direction A2, the second sidewall 102b-2 on which the handle 170 is positioned, may be pulled in the removal direction A2. Then, the stepped portion 102c may be moved outwards in a lateral direction, and the separation hole 152 may be moved toward the head portion 162 of the fastening member 160. Since the diameter of the separation hole 152 is greater than the diameter of the head portion 162 of the fastening member 160, the head portion 162 of the fastening member 160 may pass through the separation hole 152 and may be separated from the fastening hole 150. According to a structure in which the separation hole 152 extends up to the connection wall 102d and the opening 153 is formed in the connection wall 102d, the head portion 162 of the fastening member 160 may be more easily separated from the fastening hole 150 through the separation hole 152 and the opening 153. Through this configuration, when the toner cartridge 100 is locked in the main body 500, the toner cartridge 100 may not be arbitrarily removed from the main body 100. Also, when the front cover 102 is pulled to arbitrarily remove the toner cartridge 100, the front cover 102 is separated from the housing 101. Thus, damage of the locking member 503, the locking hook 140, and a coupling structure may be prevented.

When the toner cartridge 100 is mounted on the mounting portion 502 of the main body 500, the front cover 102 may be positioned in parallel to the entrance (see 502a of FIG. 1) of the mounting portion 502. That is, the front wall 102a of the front cover 102 may be aligned with the entrance 502a. The sidewall 102b of the front cover 102 may be inserted into the inside of the mounting portion 502. Since the handle 170 located on the sidewall 102b is not exposed to the outside, arbitrary removal of the toner cartridge 100 may be prevented.

The separated front cover 102 may be re-coupled to the housing 101. For example, after the fastening member 160 is separated from the fastening boss 130 and then the front cover 102 is aligned with the front end 112 of the housing 101, the fastening member 160 may be re-fastened into the fastening boss 130 while passing through the fastening hole 150. When removing the toner cartridge 100, the user may input an operation of requesting replacement of the toner cartridge 100 through the operation panel. The control unit (not shown) may slightly rotate the driving coupler 550 in the second rotation direction R2 that is opposite to the first rotation direction R1 to release the locking member 503 from the locking hook 140. In this state, the handle 170 may be held and the toner cartridge 100 may be pulled in the removal direction A2. Since the locking is released, even when the handle 170 is pulled in the removal direction A2, the front cover 102 may not be separated from the housing 101 and may be kept coupled to the housing 101. Thus, the toner cartridge 100 may be pulled in the removal direction A2 and removed from the main body 500. When a pop-up structure is provided, the locking may be released and the toner cartridge 100 may be slightly pushed in the removal direction A2. Then, the handle 170 may be exposed to the outside of the mounting portion 502. Instead of the separated front cover 102, a new front cover 102 may also be coupled to the housing 101.

Figure 6:
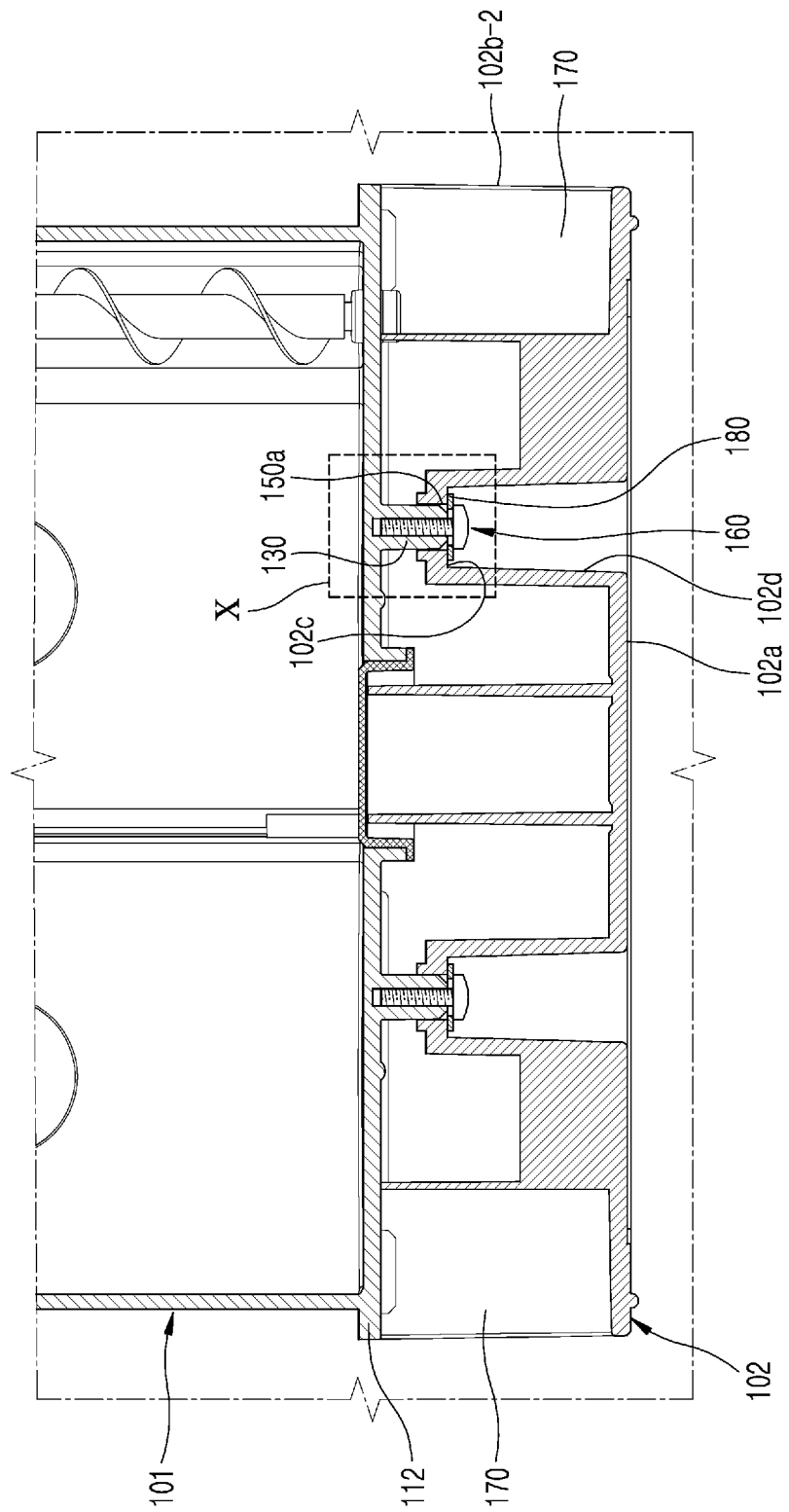
FIG. 6 is a schematic cross-sectional view of another example of a removal prevention structure.
Figure 7:
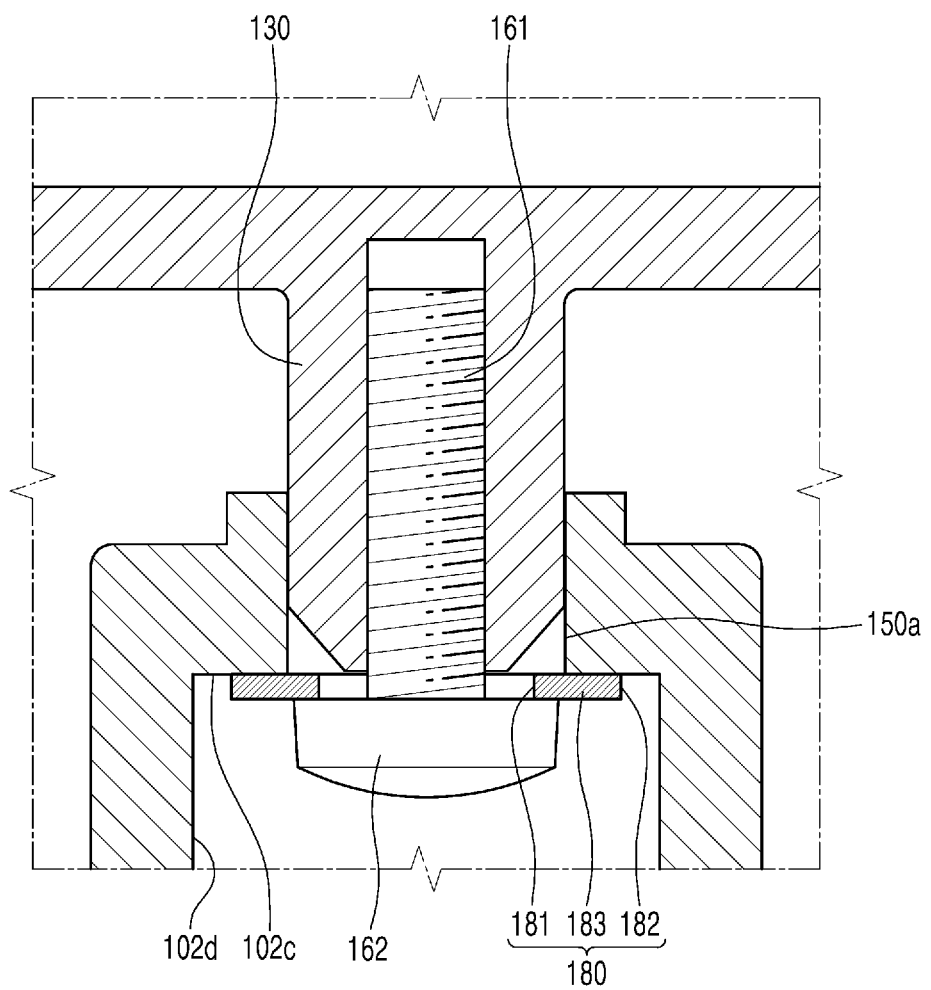
FIG. 7 is a detailed view of portion X of FIG. 6.

FIG. 6 is a schematic cross-sectional view of another example of a removal prevention structure. FIG. 7 is a detailed view of portion X of FIG. 6. Referring to FIGS. 6 and 7, the diameter of the fastening hole 150a may be greater than the diameter of the head portion 162 of the fastening member 160. In this case, in an example of a separating portion, the separating portion may include an elastic member 180 interposed between the head portion 162 of the fastening member 160 and the front cover 102. The elastic member 180 may include an inner diameter portion 181 having a diameter smaller than that of the head portion 162 of the fastening member 160, an outer diameter portion 182 having a diameter greater than that of the head portion 162 of the fastening member 160, an elastically deformable support 183 between the inner diameter portion 181 and the outer diameter portion 182.

The front cover 102 may be provided with a stepped portion 102c stepped from the front wall 102a facing the front end 112 of the housing 101 toward the front end 112 of the housing 101, and a fastening hole 150a may be formed in the stepped portion 102c. The stepped portion 102c may be connected to the front wall 102a by the connection wall 102d. The fastening member 160 may include the fastening portion 161 and the head portion 162. The elastic member 180 may have an overall washer shape including the inner diameter portion 181, the outer diameter portion 182 and the support 183 therebetween. The diameter of the inner diameter portion 181 may be greater than the diameter of the fastening portion 161 of the fastening member 160. The diameter of the inner diameter portion 181 may be less than the diameter of the head portion 162 of the fastening member 160. The diameter of the fastening hole 150a may be greater than the diameter of the head portion 162 of the fastening member 160 and may be less than the diameter of the outer diameter portion 182 of the elastic member 180. The diameter of the fastening hole 150a may be greater than a value obtained by adding the diameter of the head portion 162 of the fastening member 160 and the thickness of the elastic member 180. When the elastic member 180 is put on the stepped portion 102c and the fastening member 160 is fastened into the fastening boss 130, the head portion 162 of the fastening member 160 presses the stepped portion 102c with the support 183 of the elastic member 180 therebetween so that the front cover 102 may be coupled to the housing 101.

The elastic member 180 may be formed of an elastic material, for example, a thin polymer sheet. The material and thickness of the elastic member 180 may be determined in such a way that the elastic member 180 may not be deformed to an extend that the fastening hole 150a may pass through the head portion 162 of the fastening member 160 by the external force acting on the front cover 102 to remove the toner cartridge 100 in an unlocked state. The material and thickness of the elastic member 180 may be determined in such a way that the elastic member 180 may be deformed to an extend that the fastening hole 150a may pass through the head portion 162 of the fastening member 160 by the external force acting on the front cover 102 to remove the toner cartridge 100 in a locked state. The material and thickness of the elastic member 180 may be determined in such a way that the elastic member 180 may be deformed to an extend that the fastening hole 150a may pass through the head portion 162 of the fastening member 160 before the size of the external force acting on the front cover 102 to remove the toner cartridge 100 in the locked state reaches a size at which the locking member 503 or locking hook 140 is damaged.

Figure 8:
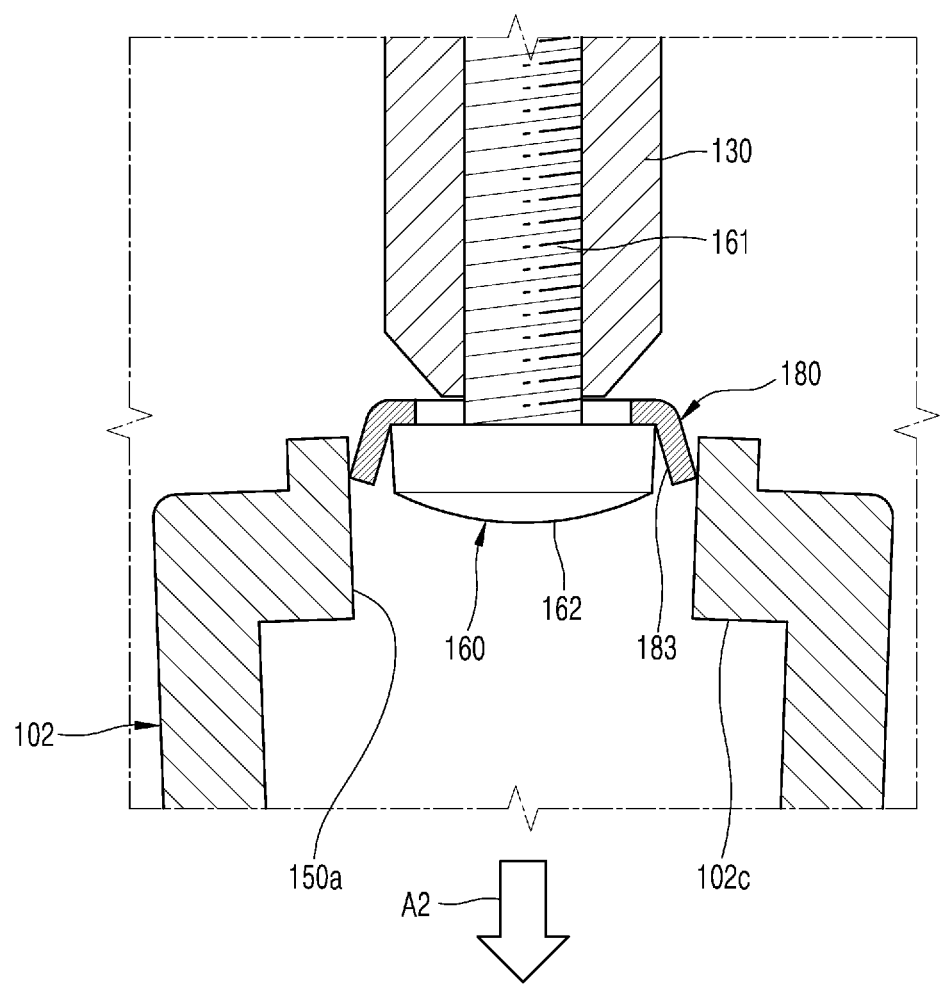
FIG. 8 is a view showing an operation of an example of the removal prevention structure shown in FIGS. 6 and 7.

FIG. 8 is a view showing an operation of an example of the removal prevention structure shown in FIGS. 6 and 7. When the toner cartridge 100 is mounted on the mounting portion 502, the locking member 503 of the main body 500 may be hung on the locking hook 140 of the toner cartridge 100 and the toner cartridge 100 may be locked in the main body 500. In this state, even when the handle 170 is pulled in the removal direction A2 to arbitrarily remove the toner cartridge 100, the toner cartridge 100 may not be moved in the removal direction A2. Instead, the stepped portion 102c of the front cover 102 may pull the elastic member 180 in the removal direction A2, and as shown in FIG. 8, the elastic member 180 may be elastically bent in the removal direction A2. Since the diameter of the fastening hole 150a is greater than a value obtained by adding the diameter of the head portion 162 of the fastening member 160 and the thickness of the elastic member 180, the head portion 162 of the fastening member 160 and the elastic member 180 may be separated from the fastening hole 150a, and the front cover 102 may be separated from the housing 101. Thus, when the toner cartridge 100 is locked in the main body 500, the toner cartridge 100 may not be arbitrarily removed. Also, when the front cover 102 is pulled to arbitrarily remove the toner cartridge 100, the front cover 102 is separated from the housing 101. Thus, damage of the locking member 503, the locking hook 140, and the coupling structure may be prevented.

The separated front cover 102 may be re-coupled to the housing 101. For example, after the fastening member 160 is separated from the fastening boss 130, the front cover 102 may be aligned with the front end 112 of the housing 101, and after the elastic member 180 is put on the stepped portion 102c, and the fastening member 160 may be re-coupled into the fastening boss 130 through the inner diameter portion 181 to the elastic member 180. When removing the toner cartridge 100, the locking of the toner cartridge 100 may be released according to the above-described operation procedure, and the handle 170 may be held, and the toner cartridge 100 may be pulled in the removal direction A2 and removed from the main body 500. Wien a pop-up structure is provided, the locking may be released, and the toner cartridge 100 may be slightly pushed in the removal direction A2. Then, the handle 170 may be exposed to the outside of the mounting portion 502. Instead of the separated front cover 102, a new front cover 102 may also be coupled to the housing 101.

Figure 9:
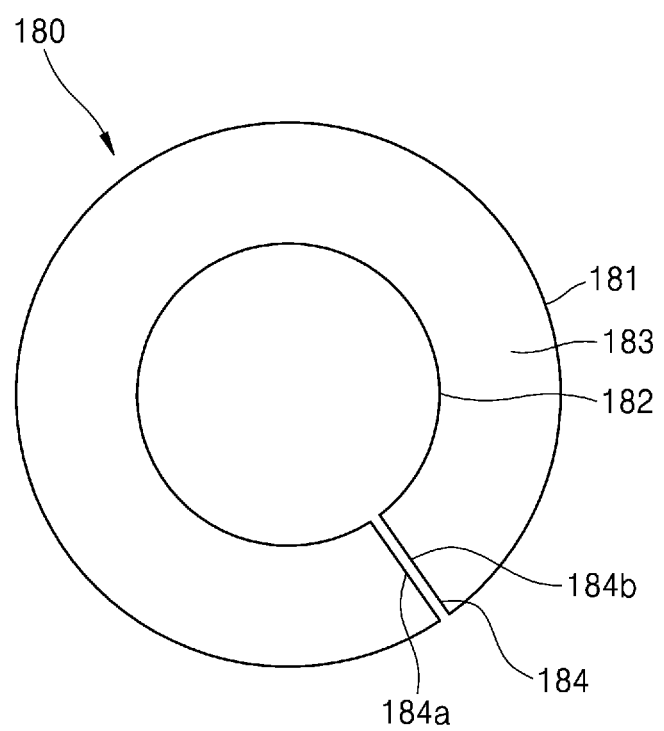
FIG. 9 is a plan view of an elastic member according to an example.

FIG. 9 is a plan view of the elastic member 180 according to an example. Referring to FIG. 9, the support 183 may be provided with a cutting groove 184 extending from the inner diameter portion 181 to the outer diameter portion 182. When the handle 170 is pulled in the removal direction A2 when the locking of the toner cartridge 100 is not released, the stepped portion 102*c* of the front cover 102 may push the elastic member 180 in the removal direction A2. When two ends 184*a* and 184*b* of the cutting groove 184 are separated from each other, the elastic member 180 may be twisted elastically. The elastic member 180 may be separated from the fastening member 160 or easily deformed into the state of FIG. 8. Thus, the fastening hole 150*a* may be separated from the head portion 162 of the fastening member 160 and the elastic member 180, the front cover 102 may be separated from the housing 101. In FIG. 9, two ends 184*a* and 184*b* of the cutting groove 184 are separated from each other. However, substantially, the two ends 184*a* and 184*b* may be in contact with each other.

It should be understood that examples described herein should be considered in a descriptive sense and not for purposes of limitation. Descriptions of features or aspects within each example should typically be considered as available for other similar features or aspects in other examples. While one or more examples have been described with reference to the figures, it will be understood by those of ordinary skill in the art that various changes in form and details may be made therein without departing from the spirit and scope as defined by the following claims.

What is claimed is:

1. A toner cartridge comprising:
 a housing to accommodate toner and including a fastening boss at a front end;
 a front cover comprising a fastening hole aligned with the fastening boss;
 a fastening member comprising a fastening portion and a head portion, the fastening portion configured to pass through the fastening hole and be fastened to the fastening boss to couple the front cover to the housing; and
 a separating portion to allow the fastening hole to be separated from the head portion of the fastening member by an external force acting on the front cover,
 wherein a diameter of the fastening hole is less than a diameter of the head portion of the fastening member, and the separating portion comprises a separation hole extending from the fastening hole and having a diameter greater than the diameter of a head portion of the fastening member such that the head portion of the fastening member is to pass through the separation hole by an external force acting on the front cover.

2. The toner cartridge of claim 1, wherein the front cover comprises a handle, and the separation hole is at an opposite side of the handle based on the fastening hole.

3. The toner cartridge of claim 2, wherein the front cover comprises a front wall having the fastening hole and a sidewall extending from lateral edges of the front wall to a front end of the housing, and the handle is on the sidewall.

4. The toner cartridge of claim 2, wherein the front cover comprises a front wall facing the front end of the housing, a stepped portion stepped from the front wall toward the front end, and a connection wall connecting the front wall to the stepped portion, and
 the fastening hole and the separation hole are in the stepped portion.

5. The toner cartridge of claim 4, wherein the separation hole extends to the connection wall and forms an opening in the connection wall.

6. The toner cartridge of claim 5, wherein a distance from the stepped portion to an end of the opening toward the front wall is greater than a thickness of the head portion of the fastening member.

7. The toner cartridge of claim 1, wherein a diameter of the fastening hole is greater than a diameter of the head portion of the fastening member, and
 the separating portion comprises an elastic member between the head portion of the fastening member and the front cover, the elastic member comprising an inner diameter portion having a smaller diameter than a diameter of a head portion of the fastening member, an outer diameter portion having a diameter greater than the diameter of the head portion of the fastening member, and an elastically deformable support between the inner diameter portion and the outer diameter portion.

8. The toner cartridge of claim 7, wherein a cutting groove extending from the inner diameter portion to the outer diameter portion is in the support.

9. An image forming apparatus comprising:
 a main body comprising a mounting portion and a locking member; and
 a toner cartridge attachable to and detachable from the mounting portion, and comprising:
 a housing to accommodate toner and including a fastening boss and a locking hook hung on the locking member at a front end and a rear end in a longitudinal direction, respectively;
 a front cover having a fastening hole aligned with the fastening boss;
 a fastening member including a fastening portion and a head portion, the fastening portion configured to pass through the fastening hole and be fastened to the fastening boss to couple the front cover to the housing; and
 a separating portion that allows the fastening hole to be separated from the head portion of the fastening member by an external force acting on the front cover, wherein a diameter of the fastening hole is less than a diameter of the head portion of the fastening member, and the separating portion comprises a separation hole extending from the fastening hole and having a diameter greater than the diameter of a head portion of the fastening member such that the head portion of the fastening member is to pass through the separation hole by an external force acting on the front cover.

10. The image forming apparatus of claim 9, wherein, when the toner cartridge is mounted on the mounting portion, an entrance of the mounting portion is parallel to the front cover.

11. The image forming apparatus of claim 9, wherein the front cover comprises a handle, and
 the separation hole is at an opposite side of the handle based on the fastening hole.

12. The image forming apparatus of claim 11, wherein the front cover comprises a front wall facing the front end of the housing, a stepped portion stepped from the front wall toward the front end, and a connection wall connecting the front wall to the stepped portion, and the fastening hole and the separation hole are in the stepped portion.

13. The image forming apparatus of claim 12, wherein the separation hole extends to the connection wall and forms an opening in the connection wall, and
- a distance from the stepped portion to an end of the opening toward the front wall is greater than a thickness of the head portion of the fastening member.

14. The image forming apparatus of claim 9, wherein a diameter of the fastening hole is greater than a diameter of the head portion of the fastening member, and
- the separating portion comprises an elastic member between the head portion of the fastening member and the front cover, the elastic member comprising an inner diameter portion having a diameter smaller than a diameter of the head portion of the fastening member, an outer diameter portion having a diameter greater than the diameter of the head portion of the fastening member, and an elastically deformable support between the inner diameter portion and the outer diameter portion.

15. The image forming apparatus of claim 14, wherein a cutting groove extending from the inner diameter portion to the outer diameter portion is in the support.

* * * * *